United States Patent [19]

Mitsuoka

[11] 3,785,707
[45] Jan. 15, 1974

[54] AUTOMATICALLY CONTROLLED HYDROSTATIC BEARING

[75] Inventor: Toyokazu Mitsuoka, Miiza, Japan

[73] Assignee: Agency of Industrial Science & Technology, Tokyo, Japan

[22] Filed: Oct. 29, 1971

[21] Appl. No.: 193,869

[30] Foreign Application Priority Data
Oct. 30, 1970 Japan.............................. 45/95680

[52] U.S. Cl. .................................................. 308/9
[51] Int. Cl. ............................................ F16c 17/16
[58] Field of Search................................ 308/9, 122

[56] References Cited
UNITED STATES PATENTS
3,442,560  5/1969  DeGast .............................. 308/5 R
3,466,951  9/1969  Greenberg .......................... 308/5 R Primary Examiner—Charles J. Myhre
Assistant Examiner—Frank Susko
Attorney—Kurt Kelman

[57] ABSTRACT

This invention is concerned with an automatically controlled hydrostatic bearing. The automatically controlled hydrostatic bearing comprises a hydrostatic bearing which has two opposite bearing recesses each communicating with a fixed linear external restrictor and a pressure-balance type control valve which has its restrictors formed with gaps of parallel plates and which functions so as to keep constant the ratio between the supply pressures to the fixed linear external restrictors and the pressures in the corresponding bearing recesses.

8 Claims, 3 Drawing Figures

AUTOMATICALLY CONTROLLED HYDROSTATIC BEARING

This invention relates to an automatically controlled hydrostatic bearing.

With a view to improving the stiffness of hydostatic bearings, automatically controlled hydrostatic bearings of varying forms have been suggested and are being put to practical use at an accelerated pace. Some of them utilize a variable restrictor means which functions to keep the bearing clearance constant even under varying magnitude of load by altering the gas height of the hydrostatic bearing in proportion to the pressure variation occurring inside the bearing recesses in consequence of change in the magnitude of the load. Others incorporate a suitable variable restrictor means or pressure regulating means in front of the fixed linear external restrictor of the hydrostatic bearing so as to regulate the pressure forwarded to the said fixed linear external restrictor, whereby the bearing clearance is kept constant even under varying magnitude of load.

In the automatically controlled hydrostatic bearings of the conventional principles, however, the transitional characteristics exhibited at the time of load application are somewhat inferior to those exhibited by the ordinary hydrostatic bearings. Further, they are not quite satisfactory in point of dynamic stiffness. Thus, there has been entertained a hope for improvements in these respects.

It is the main object of this invention to provide an automatically controlled hydrostatic bearing which enables a constant gap height to be maintained over a greater range of load than any of the conventional automatically controlled hydrostatic bearings. Thus, the bearing of this invention enjoys infinite increase of static stiffness and provides improved characteistics also in the phase of dynamic stiffness.

It is another object of this invention to provide an automatically controlled hydrostatic bearing which suppresses the phenomenon of resonance at the point of resonance in case where the supported parts happen to have a resonantly vibratory system.

The other objects and characteristics of the invention will become apparent from the description given hereinafter with reference to the accompanying drawing.

Figure 1:
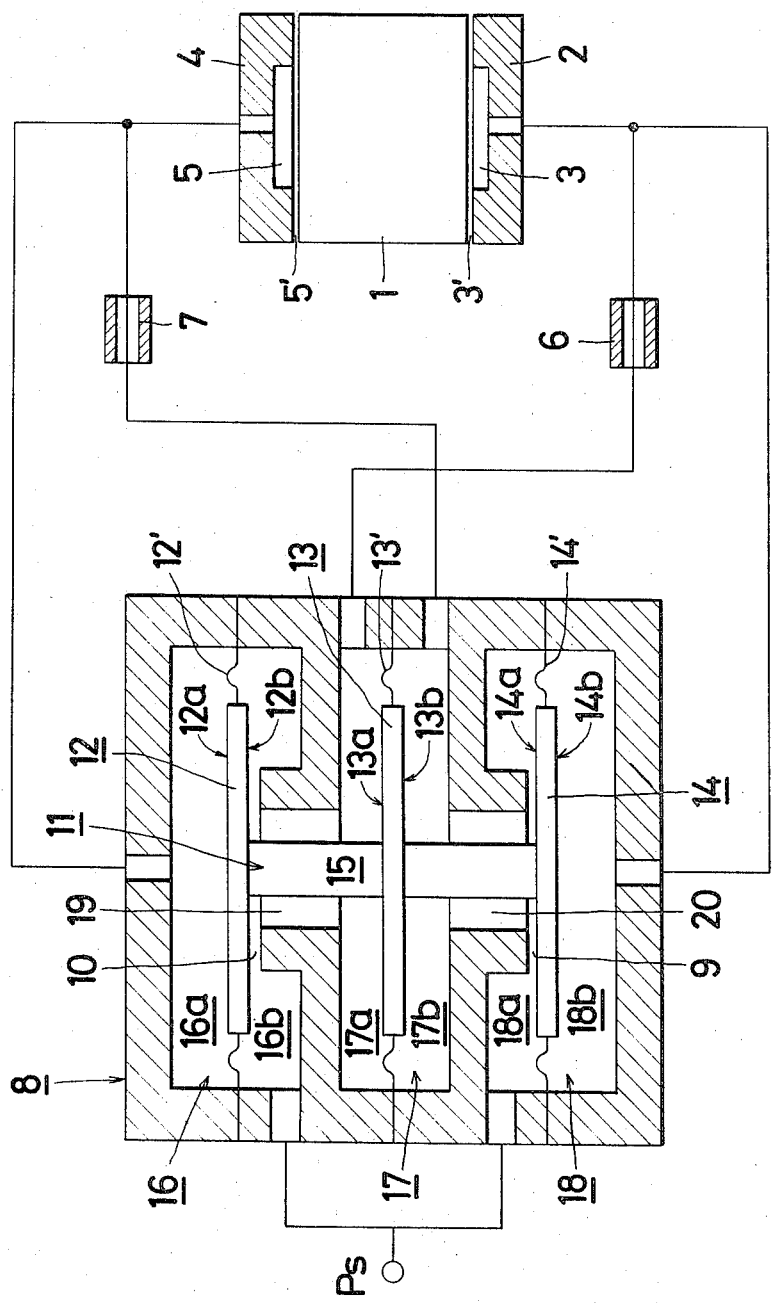
FIG. 1 is a cross-sectional view of one embodiment of the automatically controlled hydrostatic bearing according to the present invention.

Referring to FIG. 1, the load (supported part) 1 is supported in position as the weight of the supported part 1 is balanced with the force which equals the difference between the pressure within the bearing recess 3 of the bearing 2 and the pressure within the bearing recess 5 of the bearing 4 positioned symmetrically opposite to the said bearing 2. In other words, the load 1 is supported by a fluid between the two bearings 2 and 4. In this case, it is important that the load force should be balanced at all times with the supporting force provided by the pressure within the bearing recesses 3 and 5. For this purpose, the fluid path leading to the bearing recesses 3 and 5 incorporates fixed linear external restrictors 6 and 7 capable of generating fluid resistance and a control valve 8. Consequently, the fluid is supplied into the bearing recesses so that the clearance between the bearings 2 and 4 and the load 1 may be retained unchanged.

To be more specific, the high-pressure fluid Ps is forwarded to the bearing recess 3 via the variable restrictor 10 of the control valve 8 and the aforesaid fixed linear external restrictor 6. The fluid thus supplied flows through the bearing recess 3 and the bearing clearance 3' and then is discharged into the ambient air of a reservoir. The flow volume $Q_1$ of the fluid flowing at this time through the bearing clearance 3' and the pressure $Pr_1$ at the bearing recess 3 have a relationship expressed by Formula (1):

$$Q_1 = B/\mu \cdot H_1^3 \cdot Pr_1 = Kb \cdot H_1^3 \, Pr_1 \ldots \quad (1)$$

wherein, B is a constant determined by the shape of bearing, $\mu$ is the fluid viscosity, $H_1$ is the gap height of the bearing clearance 3', and Kb is a constant determined by the fluid viscosity and the shape of bearing. It is clear from Formula (1) that, to render the stiffness infinite or to maintain a constant gap height $H_1$ at the bearing clearance, the flow volume Q of fluid through the bearing and the bearing recess pressure $Pr_1$ have only to be proportionated.

The flow volume $Qc_1$ at the fixed linear external restrictor 6, the supply pressure $Pc_1$ to the fixed linear external restrictor 6, and the pressure $Pr_1$ within the bearing recess 3 have a relationship expressed by Formula (2):

$$Qc_1 = Kc_1 \, (Pc_1 - Pr_1) \ldots \quad (2)$$

wherein, $Kc_1$ is a constant determined by the fluid viscosity and the shape of fixed linear external restrictor.

Under normal condition, the fluid's flow volume $Qc_1$ at the fixed linear external restrictor 6 equals the fluid's flow volume $Qb_1$ at the bearing clearance 3'. Therefore, the following equations are derived from Formulas (1) and (2).

$Qb_1 = Qc_1 = Kb_1 \cdot H_1^3$, $Pr_1 = Kc_1 \, (Pc_1 - Pr_1)$ Thus, the supply pressure $Pc_1$ to the fixed linear external restrictor 6 is expressed by Formula (3).

$$Pc_1 = (1 + Kb_1 \cdot H_1^3/Kc_1) \, Pr_1 \ldots \quad (3)$$

From Formula (3), it is seen that, to maintain a constant gap height $H_1$ at the bearing clearance, the supply pressure $Pc_1$ to the fixed linear external restrictor has only to be varied in proportion to the bearing recess pressure $Pr_1$ being varied with the magnitude of load so that the supply pressure $Pc_1$ to the fixed linear external restrictor and the bearing recess pressure $Pr_1$ may be proportionated to each other. In other words, a bearing having infinity of stiffness can be obtained by having the supply pressure $Pc_1$ to the fixed linear external restrictor proportionated to the bearing recess pressure $Pr_1$ with respect to the relationship of Formula (3).

Now, the flow of the fluid being supplied to the bearing recess 5 is discussed. To the bearing recess 5, the high-pressure fluid Ps is supplied via the variable restrictor 9 of the control valve 8 and the fixed linear external restrictor 7. The fluid which has been forwarded to the bearing recess 5 is discharged via the bearing clearance 5' into the ambient air or into the reservoir.

The fluid's flow volume $Qr_2$ at the bearing clearance 5' is expressed by Formula (4):

$$Qr_2 = Kb_2 \cdot H_2^3 \cdot Pr_2 \quad \ldots \quad (4)$$

wherein, $Kb_2$ is a constant determined by the shape of bearing at the bearing 5 and the fluid viscosity, $H_2$ is the gap height of the bearing clearance 5', and $Pr_2$ is the fluid pressure within the bearing recess 5. The fluid's flow volume $Qc_2$ at the fixed linear external restrictor 7 is expressed by Formula (5):

$$Qc_2 = Kc_2 (Pc_2 - Pr_2) \quad \ldots \quad (5)$$

wherein, $Kc_2$ is the constant determined by the shape of fixed linear external restrictor 7 and the fluid viscosity and $Pc_2$ is the supply pressure to the fixed linear external restrictor 7.

As in the case of Formula (3), the supply pressure $Pc_2$ under normal condition to the fixed linear external restrictor is expressed by Formula (6).

$$Pc_2 = (1 + Kb_2 \cdot H_2^3 / Kc_2) Pr_2 \quad \ldots \quad (6)$$

In order to maintain the gap height $H_2$ constant, the supply pressure $Pc_2$ to the fixed linear external restrictor 7 has only to be proportionated to the pressure $Pr_2$ inside the bearing recess 5 so as to satisfy the equation of Formula (6).

The load 1 is supported in position by the supporting force which is produced by the difference of pressures in the bearing recesses ($Pr_1 - Pr_2$). If the shape of the bearing and that of the fixed linear external restrictor are so fixed as to satisfy the equations $Kb_1 = Kb_2 = Kb$, $H_1 = H_2 = H$, and $Kc_1 = Kc_2 = Kc$ with respect to Formulas (3) and (6), then the relationship between the pressure difference of the bearing recesses ($Pr_1 - Pr_2$) and the supply pressure difference to the fixed linear external restrictors ($Pc_1 - Pc_2$) is derived from Formulas (3) and (6) and expressed as follows.

$$(Pc_1 - Pc_2) = (1 + KbH^3/Kc)(Pr_1 - Pr_2) \quad \ldots \quad (7)$$

From Formula (7), it is clear that the gap height H can be maintained constant and the bearing stiffness can be infinitized by regulating the supply pressure difference to the fixed linear external restrictors ($Pc_1 - Pc_2$) so as to be proportionated to the pressure difference within the bearing recesses ($Pr_1 - Pr_2$).

The variable restrictors 9 and 10 within the control valve 8 function to control the pressure difference in the bearing recesses ($Pr_1 - Pr_2$) and the supply pressure difference to the fixed linear external restrictors ($Pc_1 - Pc_2$) in a porportionated relationship. In other words, the supply pressures to the fixed linear external restrictors 7 and 6 can be varied by the apertures of the variable restrictors 9 and 10 respectively.

The apertures are fixed by the movement of the movable part of valve 11 of the control valve. This movable part of valve 11 is composed of three parallelly disposed pressure flanges 12, 13 and 14 and a supporting shaft 15 serving to connect these pressure flanges. The pressure flanges are positioned so as to fall inside the valve chambers 16, 17 and 18 respectively. Between the pressure flanges 12, 13 and 14 and the inner wall of the chambers 16, 17 and 18 surrounding the flanges, there are suspended diaphragms 12', 13' and 14' having ignorable spring constant. These disphragms aid in supporting the movable part of the valve in position and, at the same time, separate each of the chambers 16, 17 and 18 into subchambers 16a and 16b, 17a and 17b, and 18a and 18b respectively. In the partition walls which define the chambers 16, 17 and 18, holes 19 and 20 are formed to provide loose passage of the shaft 15 and communication between the sub-chambers 16b and 17a and between the sub-chambers 17b and 18a. The aforesaid variable restrictor 10 is formed by the plane 12 positioned in the sub-chamber 16b enclosing the pressure flange 12b and the plane opening into the sub-chamber 16b of the hole 19. The variable restrictor 9 is formed between the plane 14a positioned in the sub-chamber 18a enclosing the pressure flange 14 and the plane opening into the sub-chamber 16a of the hole 20. Consequently, the high-pressure fluid having the supply pressure Ps is introduced into the sub-chambers 16b and 18a. The portion of fluid which has been introduced into the sub-chamber 16b is then forwarded via the variable restrictor 10 and the sub-chamber 17a into the fixed linear external restrictor 6. The portion of fluid which has been received in the sub-chamber 18a is delivered via the variable restrictor 9 and the sub-chamber 17b to the fixed linear external restrictor 7. Communication is established between the sub-chamber 16a and the bearing recess 5 and between the sub-chamber 18b and the bearing recess 3.

The pressures $Pr_1$ and $Pr_2$ impinge inwardly upon the outer surfaces 12a and 14b of the outer pressure flanges 12 and 14 of the variable part of valve 11. On the other surfaces 12b and 14a of the pressure flanges 12 and 14, there are exerted the supply pressure Ps and the supply pressures $Pc_1$ and $Pc_2$ to the fixed linear external restrictor. The pressures $Pc_2$ and $Pc_1$ act upon the surfaces 13a and 13b of the middle pressure flange 13 positioned inside the chamber 17.

Let $A_1$ stand for the combined area of the pressure-receiving surfaces 12a of the flange 12, 14b of the flange 14, and 13a and 13b of the flange 13, $A_s$ stand for the available combined area in the surfaces 12b and 14a respectively of the flanges 12 and 14 to be exposed to the supply pressure Ps, and $A_2$ stand for the available area to be exposed to the supply pressure $Pc_1$ and $Pc_2$ to the fixed linear external restrictors, and then the equation of Formula (8) will be obtained as the equation that represents the balance of force acting upon the valve 11.

$$A_1 (Pr_1 - Pr_2) = (A_1 - A_2)(Pc_1 - Pc_2) - A_s(Ps - Ps)$$
$$(Pc_1 - Pc_2) = A_1/A_1 - A_2 (Pr_1 - Pr_2) \quad \ldots \quad (8)$$

In the control valve 8, the supply pressures to the fixed linear external restrictors 6 and 7 are controlled respectively by fixing the apertures of the variable restrictors 9 and 10 (formed by the two parallel discs) so as to satisfy the relationship of Formula (8).

If the shape of the bearing, the shape of the fixed linear external restrictors and the shape and dimensions of the control valve are so selected as to equalize the mean proportional in Formula (8) with that in Formula (7), namely to satisfy the equation;

$$1 + (KbH_3/Kc) - A_1/(A_1 - A_2) \quad \ldots \quad (9)$$

then the supply pressure difference ($Pc_1 - Pc_2$) to the fixed linear external restrictors will be proportionated in confirmity to the variation of the pressure difference ($Pr_1 - Pr_2$) in the bearing recesses. Consequently, the bearing clearance will have a constant gap height and the stiffness of the bearing will be infinitized.

If the pressure inside the bearing recess 3 is raised because of a variation in the magnitude of load 1 supported, then the pressure inside the sub-chamber 18b in the control valve is heightened and the movable part of valve 11 is pushed up proportionally. Consequently, the aperture of the variable restrictor 9 is narrowed and the amount of fluid being supplied to the bearing recess 5 is decreased in proportion. Conversely, the aperture of the variable restrictor 10 is widened and the amount of fluid being supplied to the bearing recess 3 is increased, giving an increase to the pressure being applied thereto. This has an eventual effect of exerting the amount of pressure to the load necessary to maintain a constant gap height in the bearing clearance. As has been described, a constant gap height can be maintained at the bearing clearance even if there occurs variation in the load within the bearing. There are cases, however, in which this function of automatic control may be delayed slightly from the time at which there is a variation in the load. To preclude this delay, the automatically controlled hydrostatic bearing of this invention may incorporate a mechanism capable of compensating for the delay of operation. Now an explanation is given of such bearing.

Figure 2:
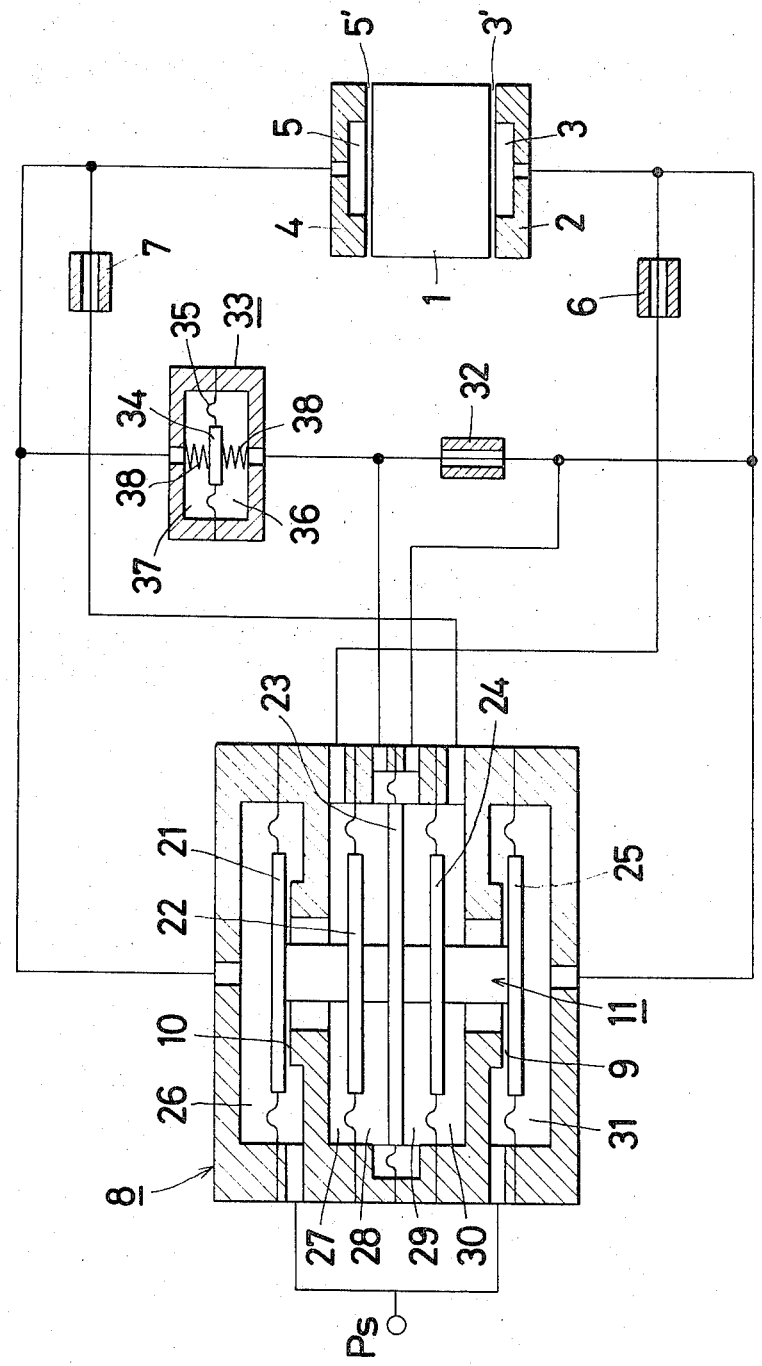
FIG. 2 is a cross-sectional view of another embodiment of the automatically controlled hydrostatic bearing possessed of a dynamic pressure compensating mechanism according to the present invention.

FIG. 2 illustrates the automatically controlled hydrostatic bearing of FIG. 1 provided with a dynamic pressure compensating mechanism.

Inside the control valve 8 is disposed a movable part of valve 11 which is possessed of 5 pressure flanges 21, 22, 23, 24 and 25. These pressure flanges are held in position by diaphragms and serve to divide the interior of the control valve into six chambers 26, 27, 28, 29, 30 and 31. As the fluid enters the chamber 28 and the pressure is applied consequently, the movable part of valve 11 is pushed down by virtue of the difference of pressure-receiving area between the pressure flanges which form the said chamber 28, with the result that the aperture of the variable restrictor 10 is narrowed and that of the variable restrictor 9 is widened. As the fluid pressure is applied to the chamber 29, the movable part of valve 11 is pushed up by virtue of the difference of pressure-receiving area between the pressure flanges 23 and 24, with the result that the aperture of the variable restrictor 10 is widened and that of the variable restrictor 9 is narrowed. The pressure inside the bearing recess 5 impinges upon the chamber 26 and the pressure inside the bearing recess 3 upon the chambers 29 and 31. To the chamber 28 is applied the interior pressure of the bearing recess 3 which is transmitted via the fixed restrictor 32. The fixed restrictor 32 and the chamber 28 communicates with the piston spring mechanism 33. This piston spring mechanism 33 is divided into two chambers 36 and 37 by the diaphragms 35 and the pressure-receiving plate 34 suspended in position with two springs 38. The chamber 36 communicates with the fixed linear external restrictor 31 and the chamber 28 of the control valve, while the chamber 37 is connected to the bearing recess 5 and the chamber 26 of the control valve 26.

When the automatically controlled hydrostatic bearing provided with such a dynamic compensating means remains in the normal condition without variation in the bearing load, the force applied to the pressure-receiving plate 34 by virtue of the pressure difference ($Pr_1 - Pr_2$) of bearing recesses is balanced with the force of the spring produced by the flexure of the pressure-receiving plate 34. Consequently, the internal pressure of the bearing recess 3 is equally introduced into the chambers 28 and 29 of the control valve 8.

Let us assume a case in which there is a variation in the bearing load and, as a consequence, the pressure $Pr_1$ inside the bearing recess 3 is increased and the pressure $Pr_2$ inside the bearing recess 5 is decreased. In this case, the variation of pressure inside the bearing recess 3 is directly relayed to the chamber 29 of the control valve 8. The variation of pressure being relayed to the chamber 28, however, is exposed to resistance produced at the fixed restrictor 32. Inside the piston spring mecanism 33, the pressure-receiving plate 34 is moved out of position by virtue of the pressure difference of bearing recesses and settles at a new position at which the force applied thereto is balanced with the force of spring, forming a certain type of capacity. Thus, the variation of pressure in the bearing recess 3 is transmitted with a definite amount of delay to the chamber 28 of the control valve 8. As a consequence, the differential value of the variation of bearing load is applied approximately to the moving part of the valve 11 of the control valve 8.

If the pressure inside the bearing recess 3 is lowered and the pressure inside the bearing recess 5 is heightened as a result of variation in the bearing load, the variation of pressure inside the bearing recess 3 is transmitted directly to the chamber 29 of the control valve 8. In the piston spring mecanism 33, the pressure-receiving plate 34 is pushed toward the chamber 36 by virtue of the pressure difference between the chamber 35 and the chamber 36 and, as a consequence, a pressure higher than that in the bearing recess 3 is applied to the chamber 28 so long as there exists such motion of the pressure-receiving plate 34. Eventually, a pressure approximating the differential value of the variation of pressure inside the bearing recess is applied to the moving part of the valve 11 of the control valve 8.

The dynamic pressure compensation mechanism of this operating principle serves to form a fluid circuit which permits a pressure approximating the differential value of the variation of pressure inside the bearing recess to be applied to the control valve 8, so that a pressure increased over the pressure inside the bearing pressure in proportion to the variation of bearing load may be applied instantaneously. This produces an effect of making compensation for the variation in the gap height at the bearing clearance with respect to the variation of load in the automatically controlled hydrostatic bearing. Accordingly, use of the dynamic pressure compensating mechanism compensates for possible delay in the pressure control system of the automatically controlled hydrostatic bearing and improves the dynamic properties of the bearing.

Figure 3:
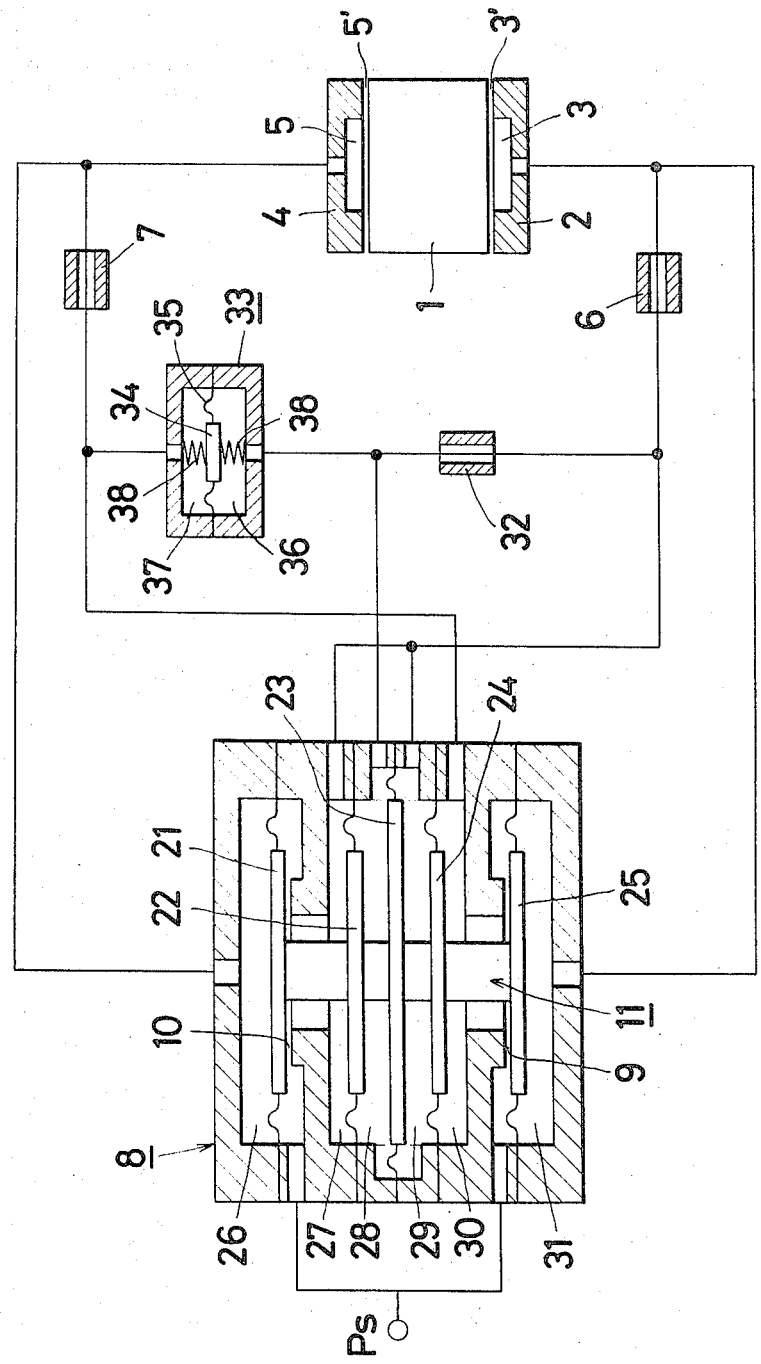
FIG. 3 is a cross-sectional view of still another embodiment of the automatically controlled hydrstatic bearing possessed of a dynamic pressure compensating mechanism according to the present invention.

FIG. 3 illustrates an embodiment in which a pressure proportional to the variation in the bearing load is withdrawn from the supply pressure side of the fixed linear external restrictor and not directly from the pressure inside the bearing recess as effected in the case of the embodiment of FIG. 2. In this case, the pressure proportional to the variation of pressure in the bearing recess, i.e., the dynamic pressure, is withdrawn with some amount of delay. However, this delay does not affect the dynamic properties of the bearing itself because the fluid for detection of dynamic pressure is not taken out of the bearing recess.

The embodiment illustrated in FIG. 3 and that in FIG. 2 are substantially the same, except for minor modifications in the connection. The equivalent parts are denoted by the same numerals and explanation on such parts is omitted to avoid repetition. As mentioned above, the embodiment of FIG. 3 differs from that of FIG. 2 only in the point that the fluid for detection of dynamic pressure is withdrawn from the supply pressure side of the fixed linear external restrictor. To be specific, the supply pressure of the fluid being forwarded via the variable restrictor 10 to the fixed linear external restrictor 6 is led to the chamber 29 of the control valve 8 and this supply pressure is led to the chamber 28 of the control valve via the fixed restrictor 32 as well. The fixed restrictor 32 and the chamber 28 are both connected to the chamber 36 of the piston spring mechanism 33. The supply pressure to the fixed linear external restrictor 7 is introduced into the chamber 37 of the piston spring mechanism 33.

The dynamic pressure compensating mechanism of this construction operates in substantially the same way as the embodiment of FIG. 2 except that they differ only in the manner in which the dynamic pressure is withdrawn. It serves to make compensation for possible delay in the pressure control system of the automatically controlled hydrostatic bearing.

As is clear from the disclosure given above, the automatically controlled hydrostatic bearing according to this invention incorporates a control valve possessed of two variable restrictors between the high-pressure fluid source and the fixed linear external restrictors. The bearing can maintain a constant gap height at the bearing clearance without reference to possible variation in the load and infinitize the stiffness when the control valve is operated so as to proportionate the supply pressure difference of the fixed linear external restrictors to the pressure difference of bearing recesses.

In the control valve, the movement which the movable part of valve is required to make is minimized because of the use of two variable restrictors formed with gaps of parallel plates. The squeeze film effect produced by the movable part of valve serves to stabilize the control valve operation and provides improvements also in the phase of dynamic properties compared with the automatically controlled hydrostatic bearing of the conventional principle.

The automatically controlled hydrostatic bearing according to this invention incorporates a variable restrictor means or a pressure controlling means adapted to vary the supply pressure to the fixed restrictor of the bearing in proportion to the variation in the pressure of the bearing recesses, so that the gap height at the bearing clearance may be maintained constant without reference to the variation of load. Further, this invention contemplates minimizing possible delay in the operation with respect to the bearing's dynamic stiffness. To accomplish this object, there is additionally incorporated a dynamic pressure compensating mechanism which is adapted to cause the dynamic pressure, i.e., the pressure corresponding to the variation in the pressure of bearing recesses, fed back by a fixed restrictor means or a piston spring mechanism to the said variable restrictor means or pressure controlling means. This has a conspicuous effect in suppressing the phenomenon of resonance at the point of resonance in case where the load being supported happens to have a resonantly vibratory system.

The preceding description is limited to the case wherein diaphragms are used as a means for partitioning the fluid pressures in the valve of the control valve and in the piston spring mechanism. These diaphragms may be replaced by ordinary piston-cylinder type having sliding surfaces, for example. In such and other respects, the device of the present invention may, of corse, be modified variously within the purview of the spirit of this invention.

What is claimed is:

1. An automatically controlled hydrostatic bearing which comprises in combination, two hydrostatic bearings disposed oppositely across a load supported thereby, each bearing having a bearing recess, two fixed linear external restrictors each communicating respectively with one of the said bearing recesses, a pressure-balance control, and a high-pressure fluid source, said high-pressure fluid source being disposed in fluid communication with the pressure-balance control, said pressure-balance control being in further fluid communication with each of said fixed linear external restrictors, said pressure-balance control having a plurality of inner chambers each of which is divided into sub-chambers by a pressure flange joined by a surrounding diaphragm attached to the inner wall of its chamber, each pressure flange being supported on a common supporting shaft, partition walls which define adjoining chambers having means providing loose passage of said shaft therein, two of said sub-chambers each comprising a parallel gap variable restrictor and communicating through fluid passage respectively with one of the said bearing recesses, two of said sub-chambers disposed intermediate said variable restrictors and in fluid communication therewith and with said high-pressure fluid source and said fixed linear external restrictors, movement of said common supporting shaft defining apertures of the said variable restrictors so as to fix constantly the ratio between the difference of supply pressure to the two fixed linear external restrictors and the difference of pressures in the bearing recesses.

2. The automatically controlled hydrostatic bearing of claim 1 wherein sub-chambers opposite to and defined by a common flange of said sub-chambers having a parallel gap variable restrictor are each in fluid communication with one of said recesses.

3. The automatically controlled hydrostatic bearing of claim 1 wherein a further pressure flange having surrounding diaphragm attached to the inner wall of its chamber is disposed between flanges of the intermediate sub-chambers.

4. The automatically controlled hydrostatic bearing of claim 1 further including a compensating mechanism adapted to cause a pressure approximating the differential valve of the variation of fluid pressures in the bearing recesses to be fed back to a sub-chamber having said further pressure flange.

5. The automatically controlled hydrostatic bearing of claim 4 wherein the compensating mechanism is in fluid communication with said sub-chambers opposite to and defined by the common flange of said sub-chambers having a parallel gap variable restrictor.

6. The automatically controlled hydrostatic bearing of claim 4 wherein the compensating mechanism is in fluid communication with said sub-chambers having a parallel gap variable restrictor, and said fixed linear external restrictors.

7. The automatically controlled hydrostatic bearing of claim 4 wherein the compensating mechanism is in fluid communication with an intermediate fixed restrictor.

8. The automatically controlled hydrostatic bearing of claim 4 wherein the compensating mechanism is a piston spring mechanism which comprises two chambers divided by a pressure-receiving plate joined by a surrounding diaphragm to an inner wall surface, said pressure-receiving plate being suspended in position by springs.

* * * * *